(12) United States Patent
Burden et al.

(10) Patent No.: US 7,598,333 B1
(45) Date of Patent: Oct. 6, 2009

(54) LOW-VISCOSITY DRAG REDUCER

(75) Inventors: Timothy L. Burden, Ponca City, OK (US); Kenneth L. Smith, Tonkawa, OK (US); Allan Browne, Angus (GB); William F. Harris, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 618 days.

(21) Appl. No.: 11/240,866

(22) Filed: Sep. 30, 2005

Related U.S. Application Data (63) Continuation of application No. 10/411,045, filed on Apr. 9, 2003, now abandoned.

(60) Provisional application No. 60/371,490, filed on Apr. 10, 2002.

(51) Int. Cl.
*C08F 210/00* (2006.01)

(52) U.S. Cl. ............... 526/348; 526/124.3; 526/125.1; 526/142; 508/591; 523/175

(58) Field of Classification Search ............. 526/124.3, 526/125.1, 142, 348; 508/591; 523/175
See application file for complete search history.

(56) References Cited

U.S. PATENT DOCUMENTS

| | | | |
|---|---|---|---|
| 3,710,865 A | 1/1973 | Kiel | |
| 3,736,288 A | 5/1973 | Stratta et al. | |
| 4,358,572 A | 11/1982 | Mack et al. | |
| 4,415,714 A | 11/1983 | Mack | |
| 4,433,123 A | 2/1984 | Mack | |
| 4,493,903 A | 1/1985 | Mack | |
| 4,845,178 A | 7/1989 | Hostetler et al. | |
| 4,881,566 A * | 11/1989 | Ubels et al. | ............ 137/13 |
| 5,165,440 A | 11/1992 | Johnston | |
| 6,015,779 A | 1/2000 | Eaton et al. | |

* cited by examiner

*Primary Examiner*—Ling-Siu Choi (57) ABSTRACT

Low-viscosity drag reducers, systems for delivering low-viscosity drag reducers, and methods of making low-viscosity drag reducers are disclosed. The low-viscosity drag reducers have a viscosity less than 350 cP at a shear rate of 250 sec$^{-1}$ and a temperature of 60° F. This low-viscosity allows the drag reducers to be delivered through a long and relatively small diameter conduit of a subsea umbilical line without an unacceptable level of pressure drop or plugging of the conduit. The low-viscosity drag reducers can be delivered to a subsea flowline carrying fluids produced from a subterranean formation to thereby provide significant drag reduction in the flowline.

19 Claims, 5 Drawing Sheets

LOW-VISCOSITY DRAG REDUCER

RELATED APPLICATIONS

This application is a continuation of U.S. patent application Ser. No. 10/411,045, filed Apr. 9, 2003 now abandoned, which claims the benefit of Provisional Application No. 60/371,490, filed Apr. 10, 2002, the entire contents of both applications are incorporated by reference herein.

BACKGROUND OF THE INVENTION

1. Field of the Invention

The present invention relates generally to compositions and delivery systems for reducing turbulent drag associated with fluids flowing through conduits. In another aspect, the invention concerns low-viscosity drag reducing compositions which can be delivered to a remote location via a relatively small diameter injection line.

2. Description of the Prior Art

In the subsea production of oil and gas, production piping typically presents a significant bottleneck because of the difficulty and expense associated with the subsea installation of the piping. The production decrease caused by bottlenecking at subsea flowlines can have severe economic ramifications due to the resulting inability to run the hydrocarbon production system at full capacity. Several options that exist for preventing or curing bottlenecking at subsea flowlines include increasing the diameter of the flowlines, increasing the number of flowlines, or reducing the amount of friction loss in the flowlines to thereby allow more flow through the same diameter lines. The first two de-bottlenecking options of increasing the size or number of flowlines are obviously very expensive. Thus, it is highly desirable to be able to reduce friction losses in subsea flowlines.

It is commonly known that a variety of drag reducers are available for reducing the friction loss of a fluid being transported through a conduit in a turbulent flow regime. Ultra-high molecular weight polymers are known to function well as drag reducers; however, drag reducers vary in their effectiveness. Traditionally, the more effective drag reducing additives have been those containing higher molecular weight polymers. Increasing the molecular weight of the polymer generally increases the percent drag reduction obtained, with the limitation that the polymer must be capable of dissolving in the liquid in which friction loss is affected.

Many offshore oil and gas production facilities are operated from remote locations which can be miles away from the production wells. When remote facilities are used to operate a subsea production facility, an umbilical line is typically employed to provide power and various flow assurance chemicals to the production facility. Such umbilical lines generally include a plurality of relatively small-diameter injection lines through which various chemicals can be introduced into the flowline at an injection point proximate the production wells. These chemicals generally include low-viscosity fluids such as hydrate inhibitors, wax inhibitors, and corrosion inhibitors which help to improve flow conditions in the flowline.

In the past, it has been proposed that drag reducing agents could be transported through an umbilical line to thereby affect a reduction in friction loss in the subsea flowline. However, due to the high viscosity and/or large particle size associated with commercially available drag reducers, existing drag reducers cannot be transported through the relatively small diameter conduits an umbilical line without causing plugging or unacceptable pressure drop. U.S. Pat. No. 4,881,566 to Ubels et al (hereinafter, "the '566 patent") discloses a method for transporting a high-viscosity, high-polymer-content drag reducer through a chemical injection line of an umbilical by facilitating the flow of the drag reducer with an immiscible low-viscosity liquid material injected at the periphery of the chemical injection line. However, the method described in the '566 patent requires special equipment for introducing the low-viscosity material into the periphery of the chemical injection line. Further, the '566 patent does not address the problems associated with drag reducers that require the formation of a strand (described below) to effectively dissolve in the host fluid.

Commercially available gel drag reducers are typically highly viscous (e.g., greater than 10,000 cP or sometimes greater than 100,000 cP at typical pumping shear rates) and highly concentrated with ultra-high molecular weight polymers. These conventional high-viscosity drag reducers must form a stable "strand" when injected into a pipeline in order for the polymer to properly dissolve. Strand formation is a viscoelastic property of a drag reducer that is dependent on many things, including the polymer molecular weight, the polymer concentration in the gel, the viscosity of the gel, and the injection dynamics. The presence of a strand provides sufficient surface area for the drag reducer to dissolve in a reasonable amount of time. Without sufficient strand stability, the drag reducer may not dissolve within the amount of time necessary to adequately reduce drag in the conduit. Strand stability can especially be a problem in multi-phase flow regimes, which are often present in offshore production lines. The high gas velocities and slugging associated with such multi-phase flow regimes result in highly chaotic environments that make stable strand formation nearly impossible. Thus, even if commercially available gel drag reducers could be effectively delivered to a remote production facility via an umbilical line, such gel drag reducers would still be ineffective due to their need to form a stable strand.

In the past, when drag reduction has been needed in chaotic flow environments that do not allow for stable strand formation, it has been necessary to utilize suspension or slurry drag reducers. However, conventional suspension or slurry drag reducers typically contain solid particulate matter that is too large to flow through an umbilical line without plugging the line.

OBJECTS AND SUMMARY OF THE INVENTION

It is an object of the present invention to provide a drag reducer that can be transported long distances through small-diameter chemical injection conduits of an umbilical line without causing unacceptable pressure loss or plugging.

Another object of the invention is to provide a drag reducer that can be transported long distances through small-diameter chemical injection conduits of an umbilical line without requiring the presence of an additional low-viscosity material to facilitate flow of the drag reducer through the chemical injection conduits.

Still another object of the invention is to provide a drag reducer that does not require formation of a strand in order to effectively dissolve in a host fluid.

Yet another object of the invention is to provide a method of reducing turbulent friction loss in a subsea flowline by transporting a drag reducer through an umbilical line and injecting the drag reducer into the subsea flowline.

A further object of the invention is to provide a method of making a drag reducer which can be transported long distances through an umbilical line and does not require formation of a strand in order to effectively dissolve in a host fluid.

It should be understood that the above-listed objects are only exemplary, and not all the objects listed above need be accomplished by the invention described and claimed herein.

Accordingly, in one embodiment of the present invention, there is provided a method comprising the steps of: (a) transporting a drag reducer through a first conduit, with the drag reducer having a viscosity less than about 350 cP at a shear rate of 250 sec$^{-1}$ and a temperature of 60° F.; and (b) introducing the transported drag reducer into a second conduit carrying fluid produced from a subterranean formation.

In another embodiment of the present invention, there is provided a method of reducing the drag forces associated with transporting hydrocarbon-containing production fluids through a substantially subsea flowline. The method comprises the steps of: (a) transporting a drag reducer from a control facility to an injection point in the subsea flowline via a subsea umbilical line, with the control facility and said injection point being separated by a distance of at least 1,000 feet, with the drag reducer having a viscosity less than about 350 cP at a shear rate of 250 sec$^{-1}$ and a temperature of 60° F., the drag reducer comprising a high molecular weight polymer substantially dissolved in a solvent, and the drag reducer being a product of solution polymerization carried out in the solvent; and (b) introducing the transported drag reducer into the flowline at the injection point.

In still another embodiment of the present invention, there is provided a method comprising the steps of: (a) transporting a drag reducer through a first conduit having a length of at least 500 feet and a maximum inside diameter of 2.5 inches or less with the first conduit being substantially devoid of any material having a viscosity less than the viscosity of the drag reducer during transporting; and (b) introducing the transported drag reducer into a second conduit carrying a fluid produced from a subterranean formation.

In yet another embodiment of the present invention, there is provided a method of reducing drag in a flowline carrying a hydrocarbon-containing fluid produced from a subterranean formation. The method comprises the steps of: (a) transporting a drag reducer through a conduit having a length of at least 1,000 feet and a maximum inside diameter of 2.5 inches or less, with the drag reducer having a solid particulate content of NAS 1638 Class 12 or less; and (b) introducing the transported drag reducer into the flowline.

In yet still another embodiment of the present invention, there is provided a method of reducing drag in a flowline carrying a hydrocarbon-containing fluid produced from a subterranean formation. The method comprises the steps of: (a) transporting a drag reducer through a subsea umbilical line, with the drag reducer comprising about 3 weight percent or less of a high molecular weight polymer; and (b) introducing the transported drag reducer into the flowline.

In a further embodiment of the present invention, there is provided a polymer solution drag reducer having a viscosity less than about 350 cP at a shear rate of 250 sec$^{-1}$ and a temperature of 60° F.

In a still further embodiment of the present invention, there is provided a polymer solution drag reducer comprising a solvent and a non-crystalline polymer. The polymer is substantially dissolved in the solvent, and has a molecular weight of at least 1×10$^6$. The drag reducer has a solid particulate content of NAS 1638 Class 12 or less.

In a yet further embodiment of the present invention, there is provided a drag reducer comprising a solvent and a non-crystalline high molecular weight polymer. The polymer is substantially dissolved in the solvent. The drag reducer comprises about 3 weight percent or less of the polymer.

In a yet still further embodiment of the present invention, there is provided a method comprising the steps of: (a) polymerizing a mixture comprising a monomer, a catalyst system, and a solvent to thereby produce a drag reducer having a viscosity less than 350 cP at a shear rate of 250 sec$^{-1}$ and a temperature of 60° F.

In an even further embodiment of the present invention, there is provided a method of making a low-viscosity drag reducer. The method comprises the steps of: (a) solution polymerizing a reaction mixture comprising an olefin monomer, a Ziegler-Natta catalyst system, and a hydrocarbon solvent to thereby form a reaction product comprising a high molecular weight polymer; and (b) short-stopping the polymerization when the reaction product comprises about 3 weight percent or less of the high molecular weight polymer.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figures 1, 2:
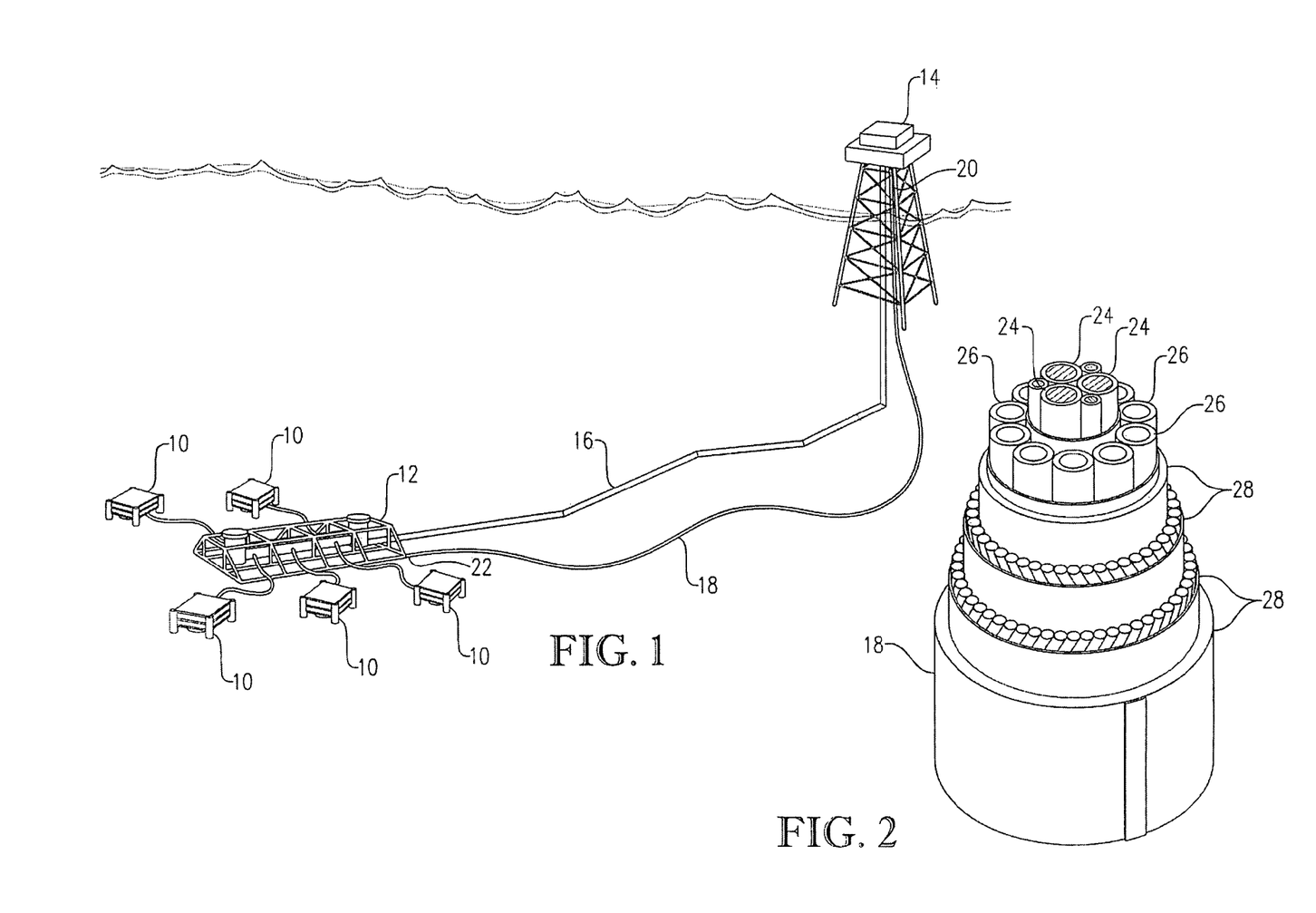
FIG. 1 is a simplified depiction of an offshore production system including a plurality of subsea wellheads connected to a common production manifold which is tied back to an offshore platform via a subsea flowline, particularly illustrating an umbilical line running from the offshore platform to the production manifold.
FIG. 2 is a partial cut-away view of an umbilical line, particularly illustrating the various electrical and fluid conduits contained in the umbilical line.

Referring initially to FIG. 1, a simplified offshore production system is illustrated as including a plurality of subsea wellheads 10, a common production manifold 12, an offshore platform 14, a subsea flowline 16, and an umbilical line 18. Each wellhead 10 is operable to produce a hydrocarbon-containing fluid from a subterranean formation. Each wellhead 10 is fluidly connected to production manifold 12 wherein the flow of the produced fluids are combined. The combined fluids from manifold 12 are transported via flowline 16 to platform 14. A first end 20 of umbilical line 18 is connected to a control facility on platform 14, while a second end 22 of umbilical line 18 is connected to wellheads 10, manifold 12, and/or flowline 16.

Referring now to FIG. 2, umbilical line 18 generally includes a plurality of electrical conduits 24, a plurality of fluid conduits 26, and a plurality of protective layers 28 surrounding electrical conduits 24 and fluid conduits 26. Referring to FIGS. 1 and 2, electrical conduits 24 carry power from platform 14 to wellheads 10 and/or manifold 12. Fluid conduits 26, commonly referred to as chemical injection lines, are typically used to inject low-viscosity flow assurance chemicals into the produced hydrocarbon-containing fluids transported back to platform 14 via flowline 16. Typical flow assurance chemicals which are injected through fluid conduits 26 include, for example, hydrate inhibitors, corrosion inhibitors, paraffin inhibitors, scale inhibitors, biocides, demulsifiers, hydrogen sulfide scavengers, oxygen scavengers, water treatments, and asphaltene inhibitors.

Although it has been desired for many years to be able to transport a drag reducer through chemical injection lines (such as fluid conduits 26) in umbilicals (such as umbilical line 18) to thereby provide for drag reduction in a subsea hydrocarbon pipeline (such as flowline 16), no conventional drag reducers have been suitable for transportation through the long and narrow chemical injection lines without the need for simultaneous injection of a separate, immiscible, low-viscosity flow facilitator material at the periphery of the lines. Typically, the length of umbilical line 18 is at least 500 feet, more typically at least 1,000 feet, and frequently 5,000 feet to 30 miles. The maximum inside diameter of each fluid conduit 26 is typically 5 inches or less, more typically 2.5 inches or less, even more typically 1 inch or less, frequently 0.5 inches or less, and sometimes 0.25 inches or less.

In one embodiment of the present invention there are provided low-viscosity drag reducer compositions which can be transported by themselves through one or more fluid conduits 26 of umbilical line 18 without causing unacceptably high pressure drops or plugging of fluid conduits 26. As used herein, the term "drag reducer" shall denote any substance that can be added to a host fluid flowing through a conduit to thereby reduce the friction loss associated with the turbulent flow of the host fluid through the conduit. Drag reducers of the invention preferably have a viscosity less than about 350 centipoise (cP) at a shear rate of 250 reciprocal seconds ($sec^{-1}$) and a temperature of 60° F. More preferably, the drag reducers have a viscosity less than about 250 cP at the previously-recited shear rate and temperature, still more preferably less than about 150 cP at the previously recited shear rate and temperature, and most preferably less than 100 cP at the previously-recited shear rate and temperature. It is further preferred for the inventive drag reducers to contain little or no solid particles in excess of about 100 microns. One common way to define the solid particulate content of a fluid is known as the NAS (National Aerospace Standard) Particulate Classification System, which follows NAS 1638/SAE AS4059 standard particle size test methods. Table 1, below, provides a relevant portion of the standard NAS 1638 Classification System.

TABLE 1

| Particle Size Range (Microns) | Class | | | | | | |
|---|---|---|---|---|---|---|---|
| | 6 | 7 | 8 | 9 | 10 | 11 | 12 |
| 5 to 15 | 16,000 | 32,000 | 64,000 | 128,000 | 256,000 | 512,000 | 1,024,000 |
| 15 to 25 | 2,850 | 5,700 | 11,400 | 22,800 | 45,600 | 91,200 | 182,400 |
| 25 to 50 | 506 | 1,012 | 2,025 | 4,050 | 8,100 | 16,200 | 32,400 |
| 50 to 100 | 90 | 180 | 360 | 720 | 1,440 | 2,880 | 5,760 |
| Over 100 | 16 | 32 | 64 | 128 | 256 | 512 | 1,024 |
| Particles per 100 ml Sample | | | | | | | |

It can be seen from Table 1, above, that as the size of solid particles in a fluid increases, so does the NAS 1638 Class associated with that fluid. In order to flow through small-diameter fluid conduits 26 of umbilical line 18 without plugging, it is preferred for the inventive drag reducers described herein to have a solids content of NAS 1638 Class 12 or less, more preferably NAS 1638 Class 10 or less, still more preferably NAS 1638 Class 8 or less, and most preferably NAS 1638 Class 6 or less. In addition, it is preferred for the inventive drag reducers to possess physical properties which allow them to be pumped through fluid conduit 26 of umbilical line 18 at typical operating conditions with a pressure drop of less than about 5 psi (pounds per square inch) per foot, more preferably less than about 2.5 psi per foot, and most preferably less than 1 psi per foot. Generally, the temperature at which the drag reducer will be transported through fluid conduit 26 is relatively low due to the cool ocean-bottom environment around umbilical line 18. Thus, the temperature of the drag reducer during transportation through fluid conduit 26 is generally less than about 60° F., more typically less than 40° F. for deep sea systems.

Once an inventive drag reducer has been injected into flowline 16, it is preferred for the drag reducer to provide a significant degree of drag reduction in flowline 16. As used herein, the term "percent drag reduction" or "% DR" shall denote the measure of the amount of the decrease in friction loss due to the injection of a drag reducer into a host fluid flowing through a conduit. Percent drag reduction (% DR) is calculated as follows:

$$\% \, DR = \frac{\text{(Pressure Drop of Host Fluid)} - \text{(Pressure Drop of Host Fluid with Drag Reducer)}}{\text{(Pressure Drop of Host Fluid)}} \times 100$$

Preferably the inventive drag reducers provide a percent drag reduction of at least about 10 percent, more preferably at least about 20 percent, and most preferably at least 30 percent at typical operating conditions of subsea flowline 16 and umbilical line 18.

In a preferred embodiment of the present invention, the inventive drag reducers comprise a high molecular weight polymer. Preferably, drag reducers of the invention are polymer solution drag reducers. As used herein, the term "polymer solution drag reducer" shall denote a drag reducer comprising a high molecular weight polymer and a solvent, wherein the high molecular weight polymer is substantially dissolved in the solvent. Preferably, such high molecular weight polymer of the inventive drag reducers has a molecular weight of at least about $1 \times 10^6$, more preferably at least about $2.5 \times 10^6$, and most preferably at least $5 \times 10^6$. The drag reducers of this invention preferably contain about 3 weight percent or less of the high molecular weight polymer, more preferably the drag reducers contain about 0.05 to about 2.5 weight percent of the high molecular weight polymer, still more preferably about 0.1 to about 2 weight percent of the high molecular weight polymer, and most preferably 0.2 to 1.5 weight percent of the high molecular weight polymer. It is preferred for the drag reducer to be injected into the host fluid (i.e., the produced hydrocarbon-containing fluid) flowing through flowline 16 in an amount such that the concentration of the high molecular weight polymer in the host fluid is in the range of from about 0.1 to about 100 parts per million by weight (ppmw), more preferably about 0.5 to about 20 ppmw, and most preferably 1 to 10 ppmw.

The high molecular weight polymer of the inventive drag reducer can be either a water soluble polymer or a hydrocarbon soluble polymer, depending of the desired application. Suitable water soluble polymers include, for example, materials such as polyethylene oxide, polyacrylamide, and partially hydrolized polyacrylamide. The water soluble polymers may also include various copolymers of acrylamide with such materials as alkylpoly (etheroxy) acrylates, methylpropane sulfonic acid, N-(3-sulfopropyl-N-methacroyloxyethyl-N), N-dimethyl-ammonium betaine (VI), quaternary salts of dimethylaminoethyl methacrylate and dimethylaminopropyl methacrylamide, poly (dimethylamino methylacrylamide), (3-acrylmido-3-methyl) butyltrimethylammonium chloride, 2-acrylamido-2-methylpropane sulfonic acid, and dimethyldiallyl ammonium chloride or other diallyl ammonium compounds. In addition there are also disclosed as water soluble polymers a mixture of a cationic copolymer having a nonionic water soluble polymer backbone and an anionic copolymer having a nonionic water soluble polymer backbone in which the water soluble polymer backbone may be acrylamide. Also disclosed are terpolymers of acrylamide, methyl styrene sulfate and methacrylmidopropyltrimethylammonium chloride. Also disclosed are copolymers of acrylamide and vinyl sulfonic acid. Another group of water soluble polymers includes those obtained by radiation polymerization of acrylamide, methacrylamide, acrylic acid, methacrylic acid, alkali metal acrylate, alkali metal methacrylate and mixtures thereof. The above water soluble polymers can be dissolved in aqueous media such that the viscosity of the resulting drag reducer meets the previously recited viscosity criteria (and other relevant criteria) for drag reducers of the present invention.

Suitable hydrocarbon soluble polymers include but are not limited to material such as polyolefins, polyisobutylene, polyacrylates, polystyrene derivatives, polydimethylsiloxane, polyisoprene, polybutadiene, cyclopentene polymers and copolymers of cyclopentene with other ethylenically unsaturated hydrocarbons such as isobutene, octene, butadiene and isoprene. Particularly desirable high molecular weight polymers are non-crystalline, hydrocarbon soluble, polyolefin homopolymers and copolymers in which the olefin monomers may contain from 2 to 30 carbon atoms. All of the various high molecular weight polymers and their methods of preparation are well known in the art. For example, U.S. Pat. No. 4,493,903 to Mack, which is incorporated by reference herein, discloses a method for producing ultra-high molecular weight, oil soluble, non-crystalline polymers of $\alpha$-olefins.

Drag reducers of the invention preferably include an aqueous or hydrocarbon solvent. The amount of solvent present in the drag reducer is typically at least about 50 percent by weight, more typically at least about 75 percent by weight, and most typically at least 90 percent by weight. In a particularly preferred embodiment, the inventive drag reducers comprise a hydrocarbon solvent, with the high molecular weight polymer being substantially or completely dissolved therein. Preferably, the solvent employed in the drag reducers of the present invention has a relatively high flash point (e.g., at least 150° F.), a relatively low viscosity (e.g., less than 20 cP), and a relatively low aromatics content (e.g., less than 20 weight percent aromatics). Examples of suitable hydrocarbon solvents include, but are not limited to, straight chain aliphatic compounds or branched hydrocarbons such as pentane, hexane, heptane or octane. Also suitable are alicyclic hydrocarbons such as cyclohexane, methyl cyclopentane and tetralin. In addition, aromatic hydrocarbons can be used such as benzene, toluene, and xylene. Of course, mixtures and analogues of these compounds can be used such as petroleum distillates including Molex (trademark of Universal Oil Products) raffinate which is a complex mixture of branched aliphatic, cyclic aliphatic, aromatic, and trace amounts (2-3%) of unbranched aliphatic hydrocarbons. The hydrocarbon diluent can also be an $\alpha$-olefin.

Hydrocarbon soluble drag reducers of the invention are preferably made via solution polymerization of a reaction mixture comprising one or more olefin monomers, a Ziegler-Natta catalyst system, and a hydrocarbon solvent. Preferably, the hydrocarbon solvent employed during solution polymerization is the same hydrocarbon solvent present in the final inventive drag reducer compositions, described above. The solution polymerization process used to form the inventive drag reducer is substantially similar to the process described in U.S. Pat. No. 4,358,572 to Mack et al, the entire disclosure of which is incorporated by reference herein.

One critical difference between the inventive polymerization process described herein and the polymerization process described in U.S. Pat. No. 4,358,572 is the point at which the solution polymerization is short-stopped (i.e., terminated) in order to provide a drag reducer that has a low viscosity and does not require significant strand formation for effective dissolution in a host fluid. Although the manner of short-stopping the solution polymerization is conventional (e.g., by adding a reaction-terminating agent such as alcohol to the reaction mixture), the timing of the short-stopping is critical to the inventive polymerization process. It is preferred for the short-stopping of the solution polymerization to occur at a point which yields a reaction product (drag reducer) having a viscosity less than about 350 cP at a shear rate of 250 sec$^{-1}$ and a temperature of 60° F., more preferably less than about 250 cP at the previously-recited shear rate and temperature, still more preferably less than about 150 cP at the previously-recited shear rate and temperature, and most preferably less than 100 cP at the previously-recited shear rate and temperature. Further, it is preferred for the short-stopping of the solution polymerization to occur when the reaction product (drag reducer) contains about 3 weight percent or less of the high molecular weight polymer, more preferably about 0.05 to about 2.5 weight percent of the high molecular weight polymer, still more preferably about 0.1 to about 2 weight percent of the high molecular weight polymer, and most preferably 0.2 to 1.5 weight percent of the high molecular weight polymer. It is also preferred for the short-stopping of the solution polymerization to occur when at least about 25 weight percent of the original olefin monomer (e.g., $C_4$-$C_{30}$ olefins) present in the original reaction mixture is still present in the reaction product, more preferably at least about 50 weight percent of the original olefin monomer is still present in the reaction product, and most preferably at least 75 weight percent of the original olefin monomer is still present in the reaction product. Thus, hydrocarbon soluble drag reducers of the invention may comprise high molecular weight polymer, hydrocarbon solvent, inactivated Ziegler-Natta catalyst, excess unreacted monomer, and the short-stopping agent.

After short-stopping of the solution polymerization, the reaction product can be filtered in a conventional manner to remove unacceptably large solid particulate matter, thereby yielding a final drag reducer composition having a solid particulate content of NAS 1638 Class 12 or less, preferably NAS 1638 Class 10 or less, more preferably NAS 1638 Class 8 or less, and most preferably NAS 1638 Class 6 or less.

EXAMPLES

These examples provide additional information to a person skilled in the art. These examples are not meant to be construed as limiting the scope of the claims.

Example 1

Preparation of Low-Viscosity Drag Reducer

For this example, it was desired to produce a drag reducer composition that was no greater than 40 cP at a shear rate of 250 $sec^{-1}$ and a temperature of 60° F. (approximately 0.9 weight percent polymer). The composition was manufactured in a dry and substantially oxygen-free insulated reactor by first preparing a monomer/solvent mixture that had been molecularly sieved to remove moisture, sufficiently purged of oxygen, and chilled to a starting reaction temperature of 30° F. The monomer/solvent mix was prepared to the following proportions:

TABLE 2

| Component | Weight Concentration |
|---|---|
| Molex ® Raffinate | 94.9% |
| Decene | 5.0% |
| Di-isobutyl Aluminum Chloride (DiBAC) | 800 ppm |
| Vanlube ® SL | 250 ppm |

The Ziegler-Natta catalyst slurry was prepared in a typical manner in the following concentrations:

TABLE 3

| Component | Weight Concentration |
|---|---|
| Molex ® Raffinate | 41% |
| $TiCl_3$ | 17% |
| Di-n-butyl ether (DBE) | 12% |
| Di-isobutyl Aluminum Chloride (DiBAC) | 30% |

The catalyst slurry was prepared in amounts sufficient to be added to the monomer/solvent mixture (shown above) at 650 ppmw. For this particular example, the product was made in a 10,000-gallon batch.

Once the catalyst slurry was added to the monomer/solvent mixture, the reaction began and continued until the temperature increase was 6.5° F. above the starting reaction temperature. After about 9 hours, the product was at the target viscosity and polymer concentration. The product was then pumped out of the reactor and contacted with Exxal®-8 (iso-octanol short-stopping alcohol) to a concentration of 0.9 weight percent Exxal®-8 in the final product. The final product was then pumped to an enclosed tank for final storage.

Example 2

Onshore Pumping of Product to Measure Viscosity

Two drag reducer compositions produced by the process described in Example 1 were tested in a pumping system to simulate an offshore chemical injection system. One composition was produced by the exact process described in Example 1 (hereafter referred to as 0.9% polymer composition) while the other composition was produced by the same process except was short-stopped at a lower temperature increase (i.e. the product was of lower viscosity and will be hereafter referred to as the 0.3% polymer composition).

Figure 3:
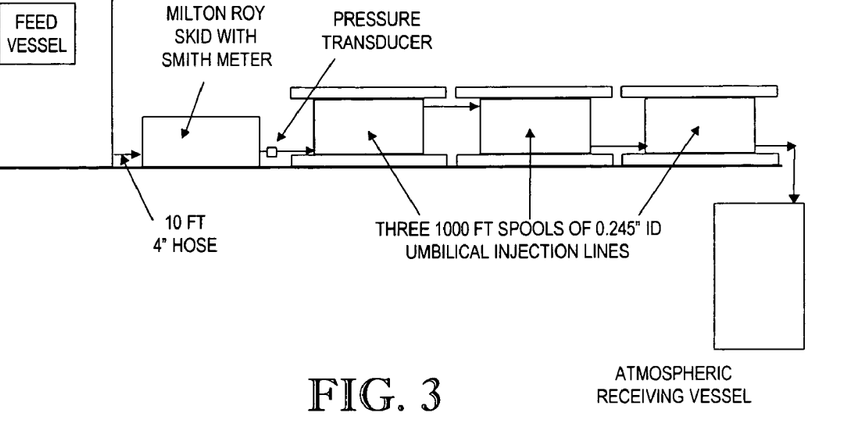
FIG. 3 is a schematic diagram of the system used for the onshore pumping tests described in Example 2.

The drag reducer compositions were pumped with a Milton Roy C pump with a maximum discharge pressure of 2500 psig (pounds per square inch, gauge) through three 1000 foot stainless steel injection lines having an inside diameter of 0.245 inches (see FIG. 3). The product temperatures varied from 80 to 90° F. during the test. The products were pumped at rates of 0.2, 0.3 and 0.4 gallons per minute. The pressure drop across the length of the line(s) and the flow rate through the lines were measured. From this information, the inside diameter of the line, and the length of the line, the viscosity could be calculated, assuming the flow was laminar. The following equations were used to calculate the dynamic viscosity ($\mu$ in cP) and the shear rate ($\gamma$ in $sec^{-1}$):

$$\mu = 3663 \frac{\left(\frac{\Delta P}{L}\right) d^4}{Q}$$

$$\gamma = 39.2 \frac{Q}{d^3}$$

where $\Delta P$=pressure drop over length L (pounds per square inch) (psi)
L=line length (ft)
Q=volumetric flow rate (gallons per minute) (gpm)
d=inside diameter (in).

To verify that the flow was laminar and the above equations were indeed accurate, the Reynolds number (Re) had to be less than 2000 by the following equation:

$$Re = 3157.44 \frac{Q(SG)}{d\mu}$$

where SG=specific gravity of the fluid. The specific gravity for this product was 0.82.

Figure 4:
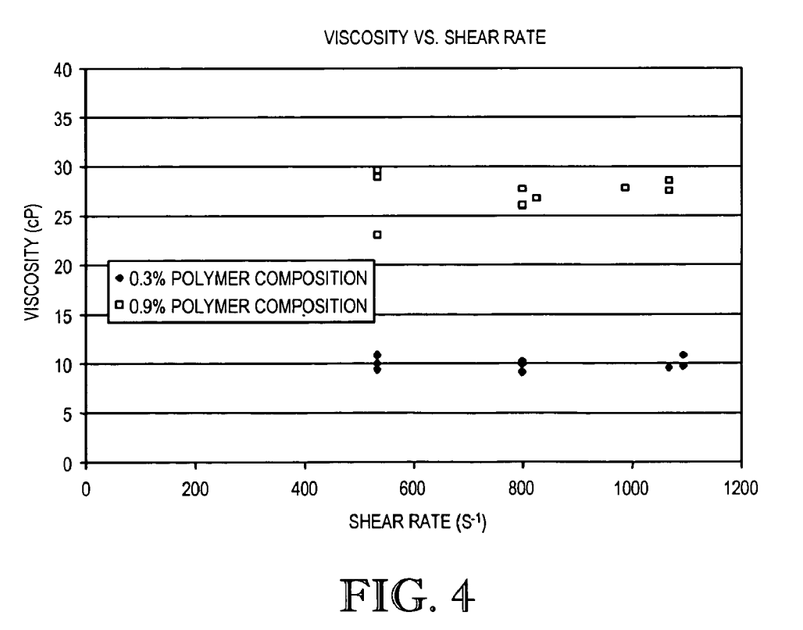
FIG. 4 is a graph of viscosity versus shear rate for the onshore pumping tests described in Example 2.

For all cases, laminar flow was validated. The viscosity of both compositions is shown in FIG. 4 as a function of shear rate. It can be seen that the compositions appeared to be non-Newtonian at these moderately high shear rates. The 0.9% polymer composition had a viscosity of about 27 cP for shear rates between 533 s$^{-1}$ and 1093 s$^{-1}$, while the 0.3% polymer composition had a viscosity of about 10 cP for the same range of shear rates.

Example 3

Offshore Testing of Low-Viscosity Drag Reducer

Figure 5:
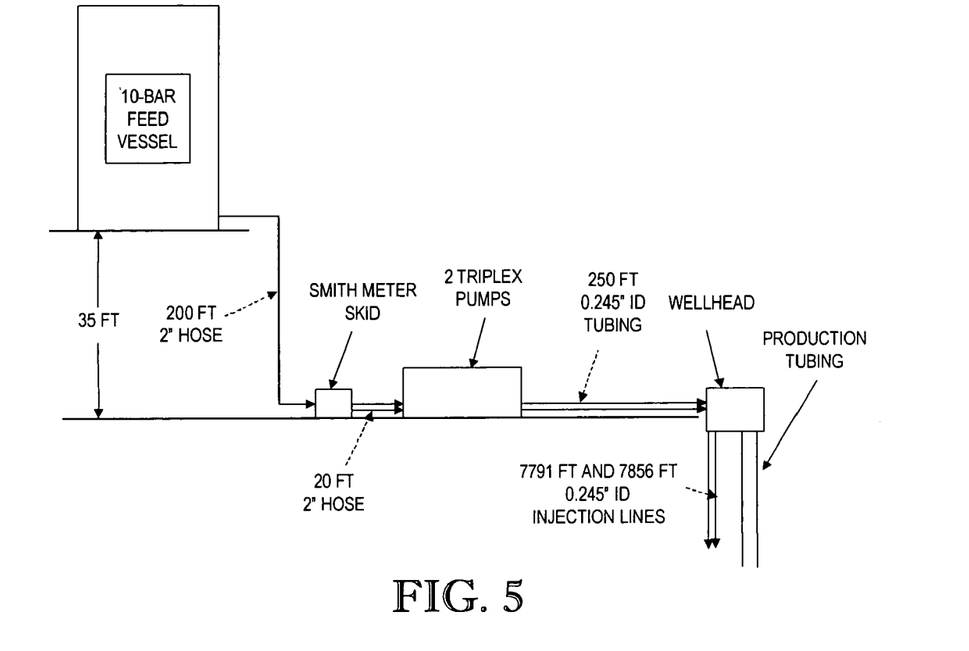
FIG. 5 is a schematic diagram of the system used for the offshore tests described in Example 3.

The 0.9% polymer drag reducer composition from Examples 1 and 2 was tested in an offshore production system shown in FIG. 5. The composition was injected simultaneously through two vertical, 0.245-inch diameter lines that were 7791 feet and 7856 feet in length. The injection lines ran into a vertical production tubing system below the sea mudline. The wellheads were located on the platform. The production fluids were natural gas and crude oil at a gas/oil ratio (GOR) of 1100 and were in an annular mist flow regime. Typically, this is not a regime in which drag reducers work well, so performance was expected at a low degree only. The product was injected at several rates listed below:

TABLE 4

| Test # | # of Injection Lines | Description | Test Time (hrs) |
|---|---|---|---|
| 1 | N/A | Baseline | 11.30 |
| 2 | 1 | 0.2 gpm injection rate | 5.01 |
| 3 | 2 | *0.4 gpm injection rate | 5.01 |
| 4 | 2 | *0.6 gpm injection rate | 5.00 |
| 5 | 2 | *0.8 gpm injection rate | 3.48 |
| 6 | 2 | *1.0 gpm injection rate | 1.20 |
| 7 | 2 | *0.6 gpm injection rate | 1.08 |
| 8 | N/A | Baseline | 14.00 |

*The injection rate is the total for both injection lines combined

Figure 6:
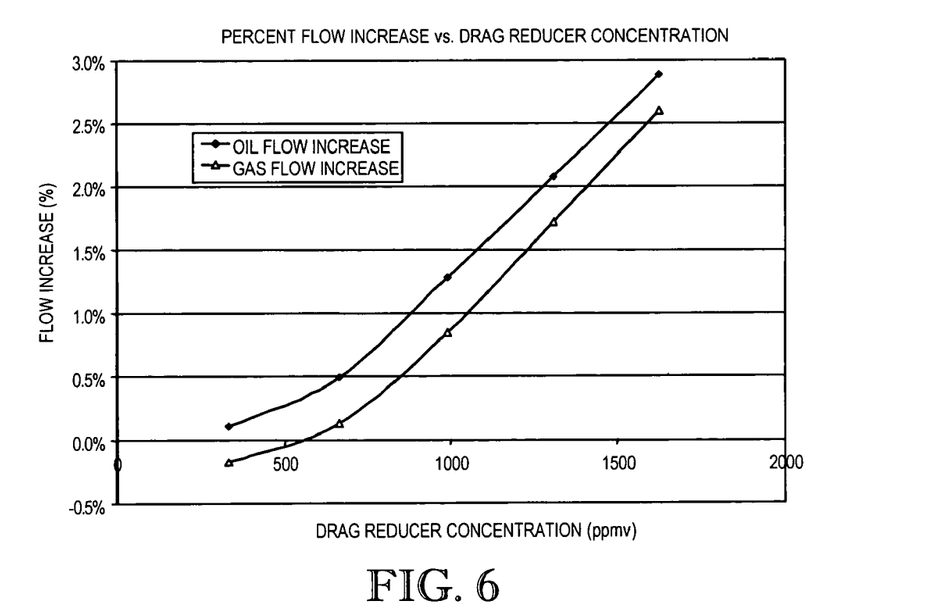
FIG. 6 is a graph of percent flow increase versus drag reducer concentration in crude oil for the offshore tests described in Example 3.
Figure 7:
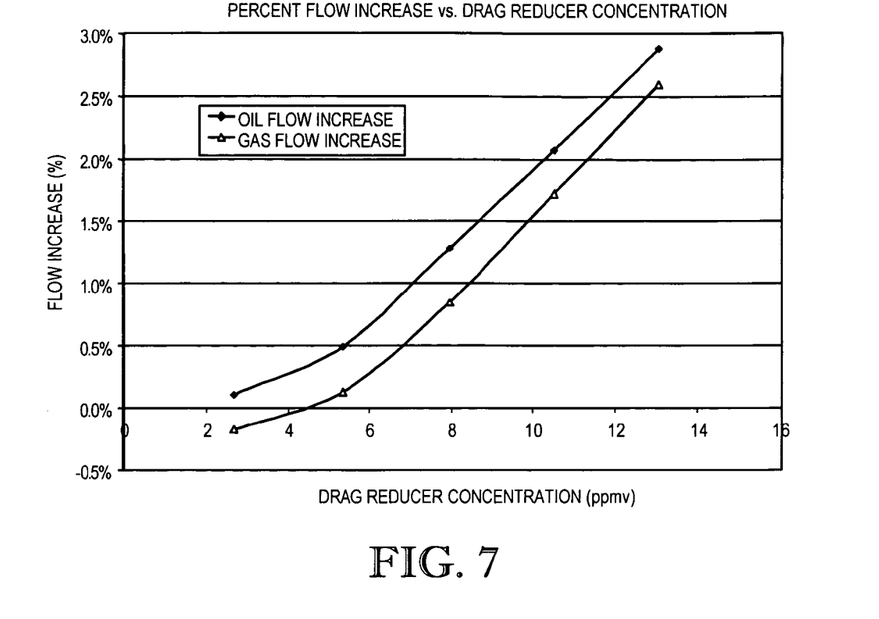
FIG. 7 is a graph of percent flow increase versus polymer concentration in crude oil for the offshore tests described in Example 3.

The increase in both oil and gas production was measured as a function of concentration of the drag reducer composition in the crude oil and is shown in FIG. 6. The actual concentration of polymer in the crude oil can be calculated based on the polymer concentration in the product and the concentration of the product in the crude oil. As shown in FIG. 7, the polymer concentration in the crude oil ranged from 3 to 15 ppm by volume.

No operational problems were encountered during the test. The line was flushed out after the test, and the production rates returned to normal. Due to pressure instrumentation problems, the percent drag reduction was not measurable; thus, only flow increase was reported.

Example 4

Chaotic Environment Drag Reduction Test

Figure 8:
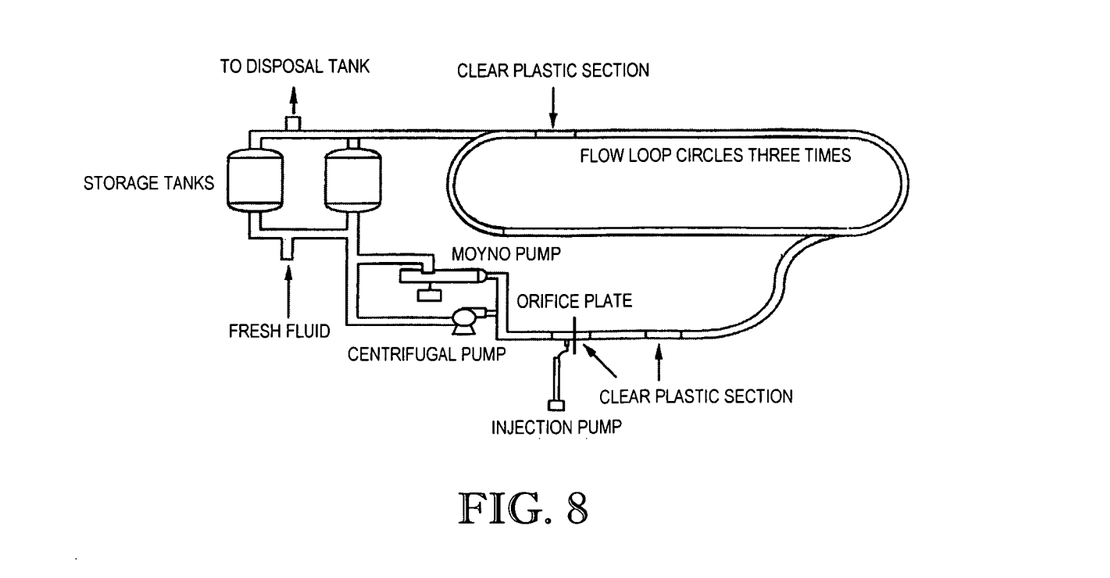
FIG. 8 is a schematic diagram of the test system used for the chaotic environment drag reduction tests described in Example 4.

In this example, a system was setup to simulate the chaotic flow environment that can occur in a production system. In order to have repeatable results, the flow used in the simulation was single phase (diesel fuel). An orifice plate having a 1-inch bore was placed in a 2-inch Schedule 80 test loop 6 inches upstream of the drag reducer injection point (see FIG. 8). Drag reduction was measured in five 88-foot segments. The purpose of the orifice plate was to provide a mechanism to break the strand without shearing the polymer. Since the inside diameter of the test loop was approximately twice the diameter of the bore of the orifice plate, the fluid velocity through the orifice plate was approximately 4 times greater than the fluid velocity in the loop. This high, localized acceleration field caused the strand to break consistently throughout the test in order to simulate a highly chaotic injection environment near the injection point that can break the injection strand. Normally, the orifice plate would act as a shearing mechanism for the drag-reducing polymer; however, with the orifice plate being so close to the injection point, the polymer did not have sufficient time to dissolve in the flowing diesel and the polymer was not sheared.

Figure 9:
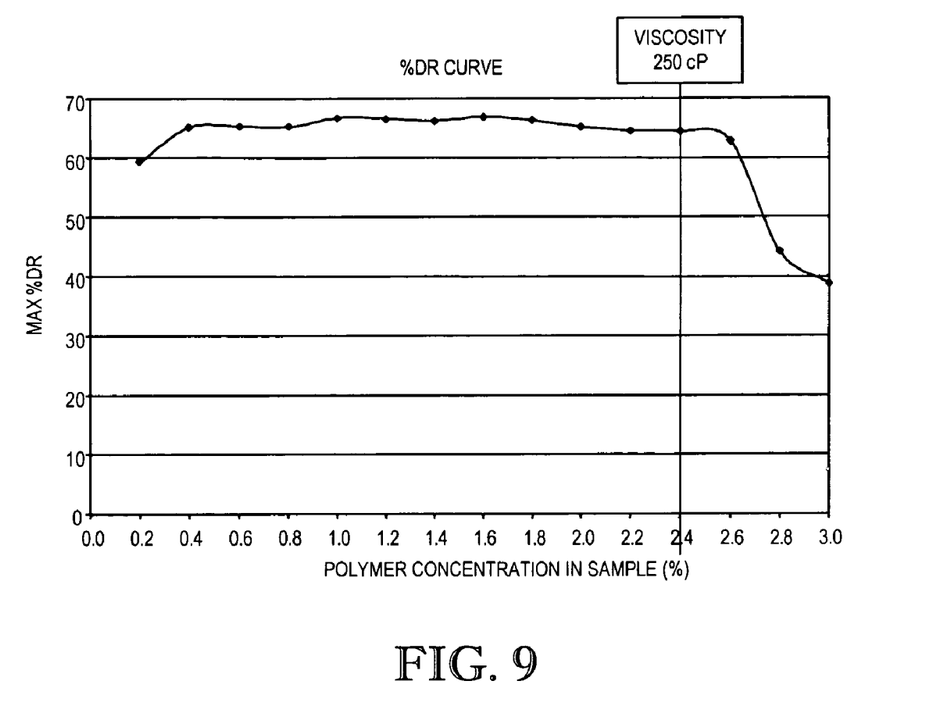
FIG. 9 is a graph of maximum percent drag reduction versus polymer concentration in the drag reducer composition for the drag reduction tests described in Example 4.

Fifteen drag reducer compositions of different viscosity (different polymer concentrations) were prepared by a different method than discussed in Example 1. The samples used in this test were made by dissolving a solid form of poly-decene in the form of a drag reducer suspension in a non-aqueous carrier into diesel in polymer concentrations ranging from 0.2% to 3.0% by weight. For each test, the drag reducer composition was injected at a volumetric flow rate of 69 mL/min into the diesel flowing at 42 gpm at 70° F. Under normal circumstances, drag reduction increases with increased polymer concentration and levels off at some maximum performance level. At high concentration levels, an increase in concentration does not provide anymore increase in drag reduction. The drag reduction results from this test are shown in Table 5 and displayed graphically in FIG. 9.

TABLE 5

| DRAG REDUCTION TESTS | | | | | | | |
|---|---|---|---|---|---|---|---|
| Polymer in Drag Reducer (Wt. %) | Polymer in Diesel (ppmw) | Segment #1 (% DR) | Segment #2 (% DR) | Segment #3 (% DR) | Segment #4 (% DR) | Segment #5 (% DR) | All Segments (Max % DR) |
| 0.2 | 0.87 | 59.39 | 59.21 | 54.71 | 53.37 | 49.37 | 59.39 |
| 0.4 | 1.73 | 63.29 | 65.18 | 64.22 | 62.75 | 61.18 | 65.18 |
| 0.6 | 2.60 | 62.57 | 65.33 | 64.76 | 62.82 | 61.44 | 65.33 |
| 0.8 | 3.47 | 63.59 | 65.27 | 65.14 | 63.08 | 61.55 | 65.27 |
| 1.0 | 4.33 | 63.62 | 65.51 | 66.72 | 63.36 | 62.05 | 66.72 |
| 1.2 | 5.20 | 64.49 | 65.49 | 66.58 | 63.28 | 61.69 | 66.58 |
| 1.4 | 6.08 | 64.51 | 66.00 | 66.23 | 63.93 | 61.69 | 66.23 |
| 1.6 | 6.93 | 64.25 | 65.93 | 66.89 | 64.58 | 62.39 | 66.89 |
| 1.8 | 7.82 | 63.26 | 65.97 | 66.23 | 64.57 | 62.51 | 66.32 |
| 2.0 | 8.68 | 61.23 | 65.20 | 65.11 | 64.13 | 61.91 | 65.20 |
| 2.2 | 9.59 | 60.41 | 64.46 | 64.59 | 63.79 | 61.80 | 64.59 |
| 2.4 | 10.38 | 58.27 | 64.44 | 64.03 | 64.16 | 62.00 | 64.44 |
| 2.6 | 11.33 | 50.41 | 59.40 | 60.82 | 62.80 | 60.62 | 62.80 |
| 2.8 | 12.18 | 34.22 | 40.14 | 39.43 | 43.45 | 44.19 | 44.19 |
| 3.0 | 13.64 | 27.92 | 32.33 | 31.63 | 36.22 | 38.70 | 38.70 |

The results show that the performance reached a plateau of about 66 percent drag reduction. However, as the more viscous samples were injected, the performance actually began to decrease significantly at a concentration of about 2.4 to 2.6% polymer. This was surprising since the more viscous samples were more concentrated and should give the same or more drag reduction performance. The viscosity of the composition at which the performance began to drop off drastically (2.4 to 2.6% polymer) was equal to 250 cP at 250 s$^{-1}$ at 60° F. This point corresponded to a point in which the instability of the strand began to negatively effect drag reduction performance.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method comprising the steps of:
   (a) transporting a drag reducer through a first conduit, said drag reducer having a viscosity less than about 350 cP at a shear rate of 250 sec$^{-1}$ and a temperature of 60° F.; and
   (b) introducing the transported drag reducer into a fluid originating from a subterranean formation,
   wherein said drag reducer has a solid particulate content of NAS 1638 Class 12 or less.

2. The method of claim 1,
said drag reducer having a viscosity less than about 250 cP at a shear rate of 250 sec$^{-1}$ and a temperature of 60° F.

3. The method of claim 1,
said drag reducer comprising a non-crystalline drag reducing polymer having a molecular weight of at least 1×10$^6$,
said drag reducer comprising about 3 weight percent or less of the drag reducing polymer.

4. The method of claim 1,
said drag reducer having a viscosity less than 100 cP at a shear rate of 250 sec$^{-1}$ and a temperature of 60° F.,
said drag reducer having a solid particulate content of NAS 1638 Class 8 or less,
said drag reducer comprising a non-crystalline drag reducing polymer having a molecular weight of at least 2.5×10$^6$,
said drag reducer comprising about 0.1 to about 2 weight percent of the drag reducing polymer.

5. The method of claim 1,
said drag reducer comprising a non-crystalline drag reducing polymer having a molecular weight of at least 2.5×10$^6$.

6. The method of claim 5,
said drag reducing polymer being water soluble.

7. The method of claim 5,
said drag reducing polymer being hydrocarbon soluble.

8. The method of claim 5,
said drag reducer comprising a hydrocarbon solvent,
said drag reducing polymer being substantially dissolved in the hydrocarbon solvent.

9. The method of claim 8,
said drag reducer being a product of solution polymerization carried out in the hydrocarbon solvent.

10. The method of claim 1,
said first conduit being at least 500 feet long and having a maximum inside diameter of 2.5 inches or less.

11. The method of claim 10,
said drag reducer being maintained at a temperature of less than about 60° F. during step (a),
said drag reducer exhibiting a pressure drop of less than about 5 psi per foot during step (a).

12. The method of claim 10,
during step (a), said first conduit being substantially devoid of any material having a viscosity less than the viscosity of the drag reducer.

13. The method of claim 1,
step (b) including introducing the transported drag reducer into a second conduit carrying the fluid originating from the subterranean formation.

14. The method of claim 13,
step (b) including providing at least a 10 percent drag reduction in the second conduit.

15. The method of claim 13,
said first conduit being at least 5,000 feet long and having a maximum inside diameter of 1 inch or less,
said drag reducer being maintained at a temperature of less than about 60° F. during step (a),
said drag reducer exhibiting a pressure drop of less than about 2.5 psi per foot during step (a),
step (b) including providing at least a 20 percent drag reduction in the second conduit.

16. The method of claim 13; and
   (c) dissolving the drag reducer in the fluid carried by the second conduit.

17. The method of claim 16,
step (c) being performed without significant strand formation in the second conduit.

18. The method of claim 13,
said first conduit being part of a subsea umbilical line used to deliver power and chemicals to a remote subsea oil production facility.

19. The method of claim 18,
said second conduit being a subsea flowline for transporting a fluid produced from a subterranean formation.

* * * * *

UNITED STATES PATENT AND TRADEMARK OFFICE
CERTIFICATE OF CORRECTION

PATENT NO. : 7,598,333 B1
APPLICATION NO. : 11/240866
DATED : October 6, 2009
INVENTOR(S) : Burden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Twenty-eighth Day of September, 2010

David J. Kappos
*Director of the United States Patent and Trademark Office*